US005883798A

United States Patent [19]

Yamaguchi

[11] Patent Number: 5,883,798

[45] Date of Patent: Mar. 16, 1999

[54] VOLTAGE/CURRENT CONVERSION CIRCUIT

[75] Inventor: Motoi Yamaguchi, Tokyo, Japan

[73] Assignee: NEC Corporation, Tokyo, Japan

[21] Appl. No.: 941,199

[22] Filed: Sep. 30, 1997

[30] Foreign Application Priority Data

Sep. 30, 1996 [JP] Japan .................................... 8-258305

[51] Int. Cl.[6] ....................................................... H02M 7/00

[52] U.S. Cl. ................................................ 363/73; 323/316

[58] Field of Search ............................... 363/73; 323/312, 323/313, 314, 315, 316

[56] References Cited

U.S. PATENT DOCUMENTS 3,906,332 9/1975 Keller ...................................... 323/270
4,399,374 8/1983 Boeke ................................. 323/315 X
4,453,121 6/1984 Noufer ................................ 323/313 X
4,727,309 2/1988 Vajdic et al. ............................ 323/315

*Primary Examiner*—Peter S. Wong
*Assistant Examiner*—Y. J. Han
*Attorney, Agent, or Firm*—Sughrue, Mion, Zinn, Macpeak & Seas, PLLC

[57] ABSTRACT

A voltage/current (v/c) conversion circuit is designed for use in integrated circuit devices. Conventional designs of v/c conversion circuits require a relatively high value of load resistor, i.e. a steep v/c conversion slope, to generate high levels of output current. In place of the high load resistor which is expensive to fabricate with IC fabrication techniques, the source-drain resistance in an n-type MOSFET is utilized, and the output current level is adjusted by adjusting the potential of a bias input circuit supplied from the gate potential in an n-type MOSFET. The proposed configuration is ideally suited to IC fabrication processes, and the circuit is useful in a many applications requiring a wide range of high current levels from a conversion circuit having a low v/c conversion factor.

4 Claims, 5 Drawing Sheets

VOLTAGE/CURRENT CONVERSION CIRCUIT

BACKGROUND OF THE INVENTION

1. Field of the Invention

The present invention relates to a voltage/current conversion circuit suitable for applications in integrated circuits.

2. Description of the Related Art

An example of the conventional voltage/current (v/c) conversion circuits used generally for converting input voltage to output current is shown in FIG. 5. In this v/c conversion circuit shown in FIG. 5, if the gain of the operational amplifier (OP amp) is ideally high, a negative feed back is generated between the OP amp 2 and an n-type metal oxide semiconductor field-effect transistor (MOSFET) 5 serving as the active load so that the voltage input terminal 1*a* and the node point 1*b* are at the same potential. Denoting the potential at the voltage input terminal 1*a* as Vin volts, the resistance of the resistor element 46 as R ohms, and the potential at the node 1*b* as Vin volts, the current Ir flowing in the resistor element 46 is given by Vin/R in amperes.

In FIG. 5, a p-type MOSFET 3 and another p-type MOSFET 4 constitute a current mirror so that the magnitude of the current flowing in p-type MOSFET 4 is the same as that flowing in p-type MOSFET 3. Therefore, the magnitude of the current flowing out of the output terminal 8, Iout, becomes the same as that flowing in the resistor element 46 given by Vin/R amperes.

The v/c conversion circuit shown in FIG. 5 is characterized by a good linearity of the input/output relation, because the voltage/current conversion ratio between the input potential Vin and the output current Iout is determined by the value of the resistor R. However, when it is desired to provide a v/c conversion circuit that produces a small variation in the output current for a given variation in the input potential, i.e., to make a voltage/current conversion circuit with a low value of voltage/current conversion ratio, it is necessary to have a high resistor R. In IC production processes, high resistor elements are not desirable, because they require an increase in the substrate area or an increase in the number of fabrication steps.

Also, the circuit shown in FIG. 5 does not permit a selection of the level of the output current, independently of the voltage/current conversion ratio. If the resistor value R is lowered to increase the output current level, the voltage/current conversion ratio inevitably becomes high (refer to FIG. 6, line b), and conversely, if the resistor value R is increased to decrease the voltage/current conversion ratio, the output current level becomes low (refer to FIG. 6, line c). Therefore, this type of circuitry is unable to produce a high level of output current, such as the one indicated by line a in FIG. 6, while providing a small variation in the output range and a low voltage/current conversion ratio, as expressed by the slope of the characteristic line.

Other examples of such v/c conversion circuits include a circuit disclosed in a Japanese Patent Application, First Publication, H1-170206, FIG. 1, which behaves in the same manner as the circuit shown in FIG. 5, and a high resistor value is needed to realize a v/c conversion circuit having a small conversion factor. Also, once the conversion factor (i.e. resistor value) is decided in a device, its output current is determined uniquely, and it is not possible to generate variable levels of output current. A circuit disclosed in FIG. 4 of the above-mentioned reference, is reported to provide a low v/c conversion factor without using a high value resistor, by relying on a biasing current $I_E$ and a resistor $R_E$ so as to make the v/c conversion factor low; however, this circuit can produce only very low levels of current.

SUMMARY OF THE INVENTION

It is an object of the present invention to provide a voltage/current conversion circuit that enables to generate variable levels of output current, without using a high value resistor element. In place of a resistor, a transistor is used in the present circuit, either a metal oxide semiconductor field-effect transistor, known as a MOSFET, or a bipolar transistor for generating the voltage/current conversion relationship.

Specifically, the present invention selects a first means related to a voltage/current conversion circuit comprising: a first active element functioning as a voltage/current conversion resistor; a comparator having a first input terminal connected to a voltage input terminal and a second input terminal connected to an output terminal of the first active element; a second active element having a control terminal connected to an output terminal of the comparator and an input terminal connected to the output terminal of the first active element so as to function as an active load; a third active element having an input terminal connected to a power input terminal, and an output terminal and a control terminal connected to an output terminal of the second active element; and a fourth active element having an input terminal connected to a power input terminal, a control terminal connected to the control terminal of the third active element, and an output terminal connected to a current output terminal so as to provide a flow of electrical current whose magnitude is proportional to a magnitude of electrical current flowing in the third active element.

A second means related to the voltage/current conversion circuit is selected so that the first, second, third and fourth active elements, in the first means, correspond, respectively, to first, second, third and fourth transistors.

A third means related to the voltage/current conversion circuit is selected so that the first transistor, in the second means, is a first n-type metal oxide semiconductor field-effect transistor, known as an n-type MOSFET, the second transistor is a second n-type MOSFET, the third transistor is a first p-type MOSFET and the fourth transistor is a second p-type MOSFET; wherein the input terminal corresponds to a source terminal in the first n-type MOSFET, in the second n-type MOSFET, in the first p-type MOSFET and in the second p-type MOSFET; the output terminal corresponds to a drain terminal in the first n-type MOSFET, in the second n-type MOSFET, in the first p-type MOSFET and in the second p-type MOSFET; and the control terminal corresponds to a gate terminal in the first n-type MOSFET, in the second n-type MOSFET, in the first p-type MOSFET and in the second p-type MOSFET.

A fourth means related to the voltage/current conversion circuit is selected so that the comparator, in the first means, is an operational amplifier, wherein a first input terminal is a positive input terminal and a second terminal is a negative input terminal.

A fifth means related to the voltage/current conversion circuit is selected so that the comparator, in the third means, is an operational amplifier, wherein a first input terminal is a positive input terminal and a second terminal is a negative input terminal.

A sixth means related to the voltage/current conversion circuit is selected so that the first transistor, in the second means, is an n-p-n bipolar transistor whose emitter terminal is connected to a resistor, and the second transistor is an n-type MOSFET, the third transistor is a first p-type MOSFET and the fourth transistor is a second p-type MOSFET; wherein the input terminal corresponds to a source terminal in the n-type MOSFET, in the first p-type MOSFET and in the second p-type MOSFET; the output terminal corresponds to a gate terminal in the n-type MOSFET, in the first p-type MOSFET and in the second p-type MOSFET; and the control terminal corresponds to a drain terminal in the n-type MOSFET, in the first p-type MOSFET and in the second p-type MOSFET.

A seventh means related to the voltage/current conversion circuit is selected so that, in the sixth means, the comparator is an operational amplifier, wherein a first input terminal is a positive input terminal and a second terminal is a negative input terminal.

An eighth means related to the voltage/current conversion circuit is selected so that a voltage/current conversion circuit comprises: a first active element functioning as a voltage/current conversion resistor; a comparator having a first input terminal connected to a voltage input terminal and a second input terminal connected to an output terminal of the first active element; a second active element having a control terminal connected to an output terminal of the comparator, and an input terminal connected to the output terminal of the first active element so as to function as an active load; a third active element having an output terminal and a control terminal connected to an output terminal of the second active element; and a fourth active element having a control terminal connected to the control terminal of the third active element, and an output terminal connected to a current output terminal so as to provide a flow of electrical current whose magnitude is proportional to a magnitude of electrical current flowing in the third active element.

A ninth means related to the voltage/current conversion circuit is selected so that the first, second, third and fourth active elements, in the eighth means, correspond, respectively, to first, second, third and fourth transistors.

A tenth means related to the voltage/current conversion circuit is selected so that the first transistor, in the ninth means, is a first p-type metal oxide semiconductor field-effect transistor, known as an n-type MOSFET, the second transistor is a second p-type MOSFET, the third transistor is a first n-type MOSFET and the fourth transistor is a second n-type MOSFET; wherein the input terminal corresponds to a source terminal in the first p-type MOSFET, in the second p-type MOSFET, in the first n-type MOSFET and in the second n-type MOSFET; the output terminal corresponds to a drain terminal in the first p-type MOSFET, in the second p-type MOSFET, in the first n-type MOSFET and in the second n-type MOSFET; and the control terminal corresponds to a gate terminal in the first p-type MOSFET, in the second p-type MOSFET, in the first n-type MOSFET and in the second n-type MOSFET.

An eleventh means related to the voltage/current conversion circuit is selected so that the comparator, in the eighth means, is an operational amplifier, wherein a first input terminal is a positive input terminal and a second terminal is a negative input terminal.

An twelfth means related to the voltage/current conversion circuit is selected so that the comparator, in the tenth means, is an operational amplifier, wherein a first input terminal is a positive input terminal and a second terminal is a negative input terminal.

A thirteenth means related to the voltage/current conversion circuit is selected so that the first transistor, in the ninth means, is a p-n-p bipolar transistor whose emitter terminal is connected to a resistor, the second transistor is a p-type metal oxide semiconductor field-effect transistor, known as a p-type MOSFET, the third transistor is a first n-type MOSFET and the fourth transistor is a second n-type MOSFET; wherein the input terminal corresponds to a source terminal in the p-type MOSFET, in the first n-type MOSFET and in the second n-type MOSFET; the output terminal corresponds to a drain terminal in the p-type MOSFET, in the first n-type MOSFET and in the second n-type MOSFET; and the control terminal corresponds to a gate terminal in the p-type MOSFET, in the first n-type MOSFET and in the second n-type MOSFET.

A fourteenth means related to the voltage/current conversion circuit is selected so that the comparator, in the thirteenth means, is an operational amplifier, wherein a first input terminal is a positive input terminal and a second terminal is a negative input terminal.

The present invention thus achieved the object of providing a voltage/current conversion circuit, suitable for IC fabrication processes, which is applicable to a variety of integrated circuit devices. The important concept behind the various approaches is that, by replacing a single-valued component (i.e. a high value resistor) in the conventional v/c conversion circuit with a multi-valued transistor circuit, the present invention has provided a v/c conversion circuit that can be fabricated by normal standard IC fabrication processes, and whose output current can be adjusted to a high level and controlled to within a small range of output current. Such a circuit should find ready uses in VCR controls?, CCD biasing? and other related applications that require fine current adjustments within a relatively high range of output current.

DESCRIPTION OF THE PREFERRED EMBODIMENTS

In the following, preferred embodiments of the v/c conversion circuits will be presented with reference to the drawings.

Figure 1:
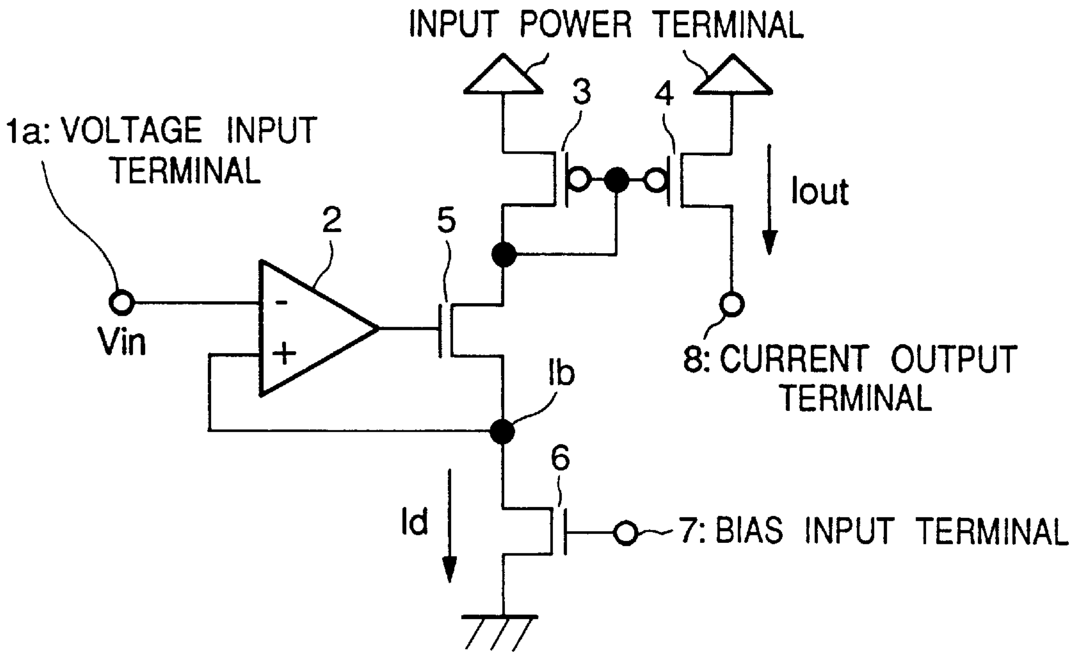
FIG. 1 is a first embodiment of the v/c conversion circuit of the present invention.

A first embodiment is shown in FIG. 1. The positive input terminal of the OP amp 2 is connected to the voltage input terminal 1*a* of the v/c conversion circuit, the negative input terminal to the node 1*b*, and the output terminal to the gate terminal of the n-type MOSFET 5. The source terminal of the n-type MOSFET 5 is connected to the node 1*b* (negative input terminal of OP amp 2). The n-type MOSFET 6, which replaces a resistor in the conventional v/c conversion circuit, has its drain terminal connected to the node 1*b*, its gate terminal to the bias input terminal 7, and its source terminal to ground. The p-type MOSFET 3 and the p-type MOSFET 4 constitute a current mirror, and the source terminals of the p-type MOSFET 3 and the p-type MOSFET 4 are connected to their respective input power terminals. The gate terminal and the drain terminal of the p-type MOSFET 3 and the gate terminal of the p-type MOSFET 4 are connected to the drain terminal of the p-type MOSFET 5. The drain terminal of the p-type MOSFET 4 is connected to the current output terminal 8 of the v/c conversion circuit.

Denoting A as the gain of the OP amp 2, Va as the potential at the voltage input terminal 1*a* and Vb as the potential at the node 1*b*, the output potential of the OP amp 2 (gate potential of the n-type MOSFET 5) is given by A·(Va−Vb). The drain current Id of the n-type MOSFET 5 is given by equation 1:

$$\begin{aligned} Id &= Kn\cdot\{A\cdot(Va-Vb)-Vb-Vtn\}^2 \\ &= Kn\cdot[A\cdot\{Va-Vb-(Vb+Vtn)\}/A]^2 \end{aligned} \quad \text{Eqn. 1}$$

where Vtn is a threshold voltage value of the n-type MOSFET 5, and Kn is an empirical constant determined by the transistor size and fabrication process.

The resistance Rds between the source and drain of the n-type MOSFET 6 can be expressed by equation 2:

$$Id=Vb/Rds \quad \text{Eqn. 2}$$

From equations 1 and 2, equations 3 and 4 can be derived:

$$Vb/Rds=Kn\cdot[A\cdot\{Va-Vb-(Vb+Vtn)/A\}]^2 \quad \text{Eqn. 3}$$

$$\{Va-Vb-(Vb+Vtn)/A\}^2=Vb/(Rds\cdot Kn\cdot A^2) \quad \text{Eqn. 4}$$

If it can be assumed that the gain A of the OP amp 2 is sufficiently greater than the potential Vb, then the following equation can be derived:

$$(Va-Vb)^2\approx 0, \text{ leading to}$$

$$Va\approx Vb \quad \text{Eqn. 5}$$

Because of the action of the OP amp 2 in conjunction with n-type MOSFET 5 and n-type MOSFET 6, the potential Vb at the node 1*b* always follows the potential Va at the voltage input terminal 1*a*. If the potential at the voltage input terminal 1*a* is Va=Vin, then the potential at the node 1*b* will also be Vb=Vin.

Because the current does not flow in the gate terminal of MOSFETs, the magnitude of the current flowing in the n-type MOSFET 5 and in the n-type MOSFET 6 is always equal to that of the current flowing in p-type MOSFET 3. Also, because the p-type MOSFET 3 and the p-type MOSFET 4 form a current mirror, the potentials between the gate/source terminals in both transistors are always equal to each other, and if the transistor sizes are the same, the magnitudes of the current flowing in transistors 3 and 4 are the same. In other words, the output current Iout flowing out of the current output terminal 8 always equals the current flowing in the n-type MOSFET 6.

Thus, the voltage- current characteristics of the input voltage Vin at the voltage input terminal 1*a* to the output current Iout at the current output terminal 8 is the same as those between the potential Vb at the node 1*b* and the drain current Id of the n-type MOSFET 6.

Figure 7:
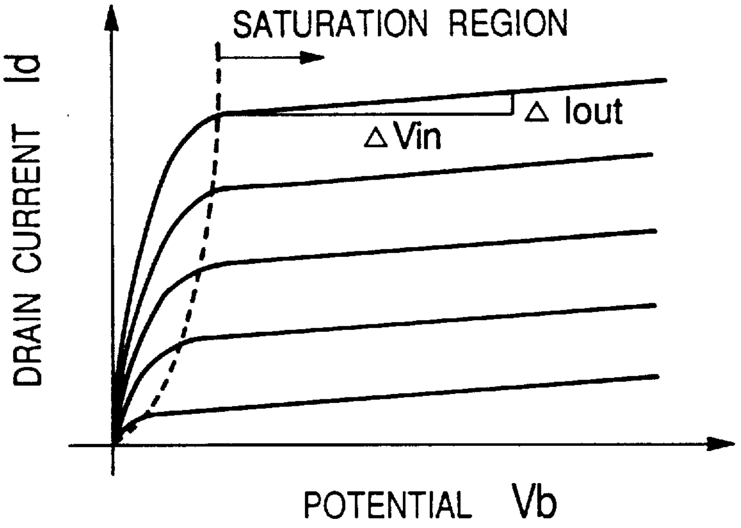
FIG. 7 is a characteristic voltage/current curve of an n-type MOSFET.

The voltage-current characteristic curve of the n-type MOSFET 6 is shown in FIG. 7. This relation is directly applicable to that for the input voltage Vin vs. output current Iout of the first embodiment v/c conversion circuit.

When the potential at the bias input terminal 7 (gate potential of n-type MOSFET 6) is constant and the n-type MOSFET 6 is operating in its saturation region, changes in the drain current Id are small with respect to the changes in the potential Vb at the node 1*b*, and the same voltage-current characteristics, as the voltage-current characteristics based on a high value resistor element, are obtained.

The slope of a voltage-current curve of a MOSFET operating in the saturation range is affected by the degree of channel length modulation effect, so that by increasing the gate length of MOSFET 6 so as to decrease the channel length modulation effect, it is possible to obtain a circuit having a lesser slope, i.e., a v/c conversion circuit exhibiting a low voltage/current conversion ratio.

Furthermore, by changing the potential at the bias input terminal 7, it is possible to change the level of the drain current, with negligible change in the slope of the curve, thereby enabling to freely select any level of output current.

Figure 2:
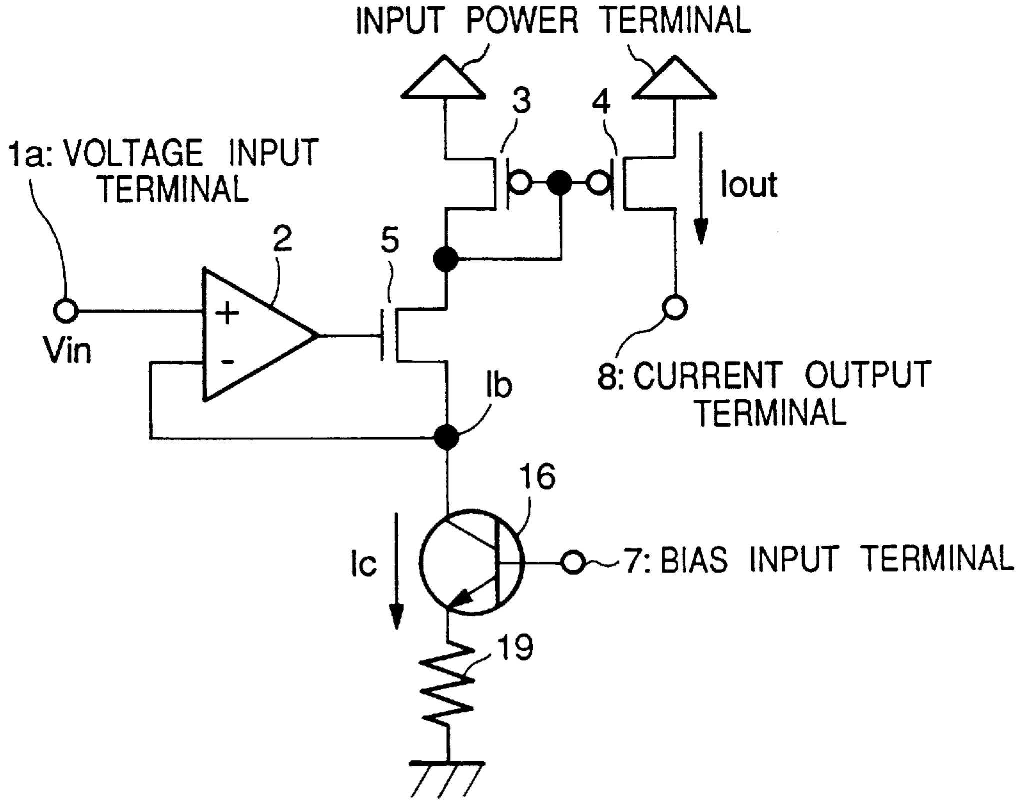
FIG. 2 is a second embodiment of the v/c conversion circuit of the present invention.

FIG. 2 presents a second embodiment of the v/c conversion circuit. This circuit is obtained by replacing the n-type MOSFET 6 in the first embodiment circuit, shown in FIG. 1, with an n-p-n bipolar transistor 16 and a resistor element 19.

The n-p-n bipolar transistor 16 has its collector terminal connected to the node 1*b*, and the base terminal to the bias input terminal 7. One terminal of the resistor element 19 is connected to the emitter terminal of the n-p-n bipolar transistor 16 and the other terminal is grounded.

As in the first embodiment circuit, the potential Va at the voltage input terminal 1*a* and the potential Vb at the node 1*b* are equal, and the collector current Ic flowing in the n-p-n bipolar transistor 16 is equal to the output current Iout flowing out from the current output terminal 8.

Therefore, the characteristic curve of the input voltage Vin (potential at the voltage input terminal 1*a*) vs. output current Iout of the v/c conversion circuit, shown in FIG. 2, is the same as the voltage-current curve for the potential Vb at the node 1*b* vs. collector current Ic of the n-p-n bipolar transistor 16.

Figure 8:
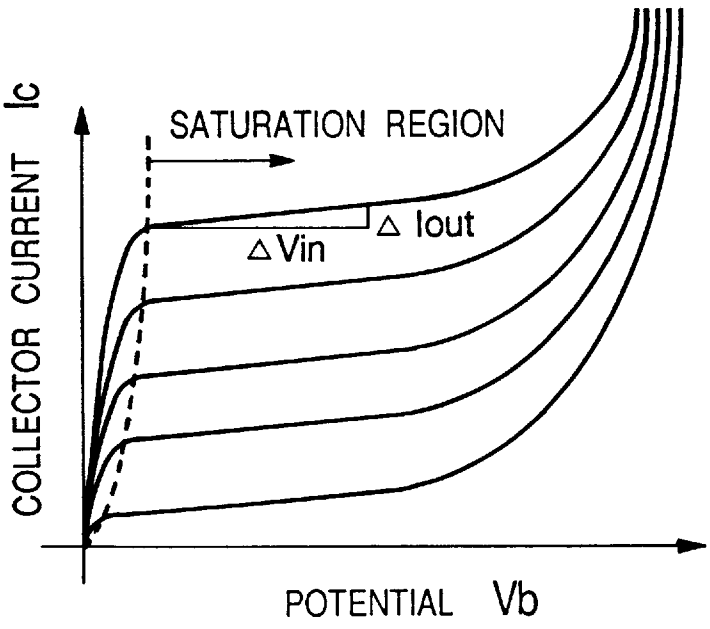
FIG. 8 is a characteristic voltage/current curve of an n-p-n bipolar transistor.

FIG. 8 shows a voltage-current curve of the n-p-n bipolar transistor 16 having a resistor element 19 connected between the emitter and the ground. The slope of the voltage-current curve in the saturation range is affected by the value of the resistor element 19 connected between the emitter and the ground. By increasing the value of the resistor element 19, the slope decreases so that a v/c conversion circuit having a low voltage/current conversion ratio can be realized.

Although the aspect of the circuit that the resistor value determines the voltage/current conversion ratio is the same as in the conventional v/c conversion circuit, it should noted that the present conversion circuit shown in FIG. 2 differs from the conventional conversion circuit in the aspect that the resistor 19 is utilized in a series-arrangement with an n-p-n bipolar transistor 16, it means that a low voltage/current conversion ratio can be achieved with a value of the resistor element 19 small enough (several tens of ohms to several hundreds of ohms) to be produced within the capability of ordinary IC fabrication processes. In other words, the v/c conversion circuit of the second embodiment can be produced without increasing neither the number of processing steps nor the substrate area.

Similar to the first embodiment circuit, by changing the potential of the bias input terminal 7 (base current in the n-p-n bipolar transistor 16) the output current Iout can-be freely selected, independent of the v/c conversion factor.

Figure 3:
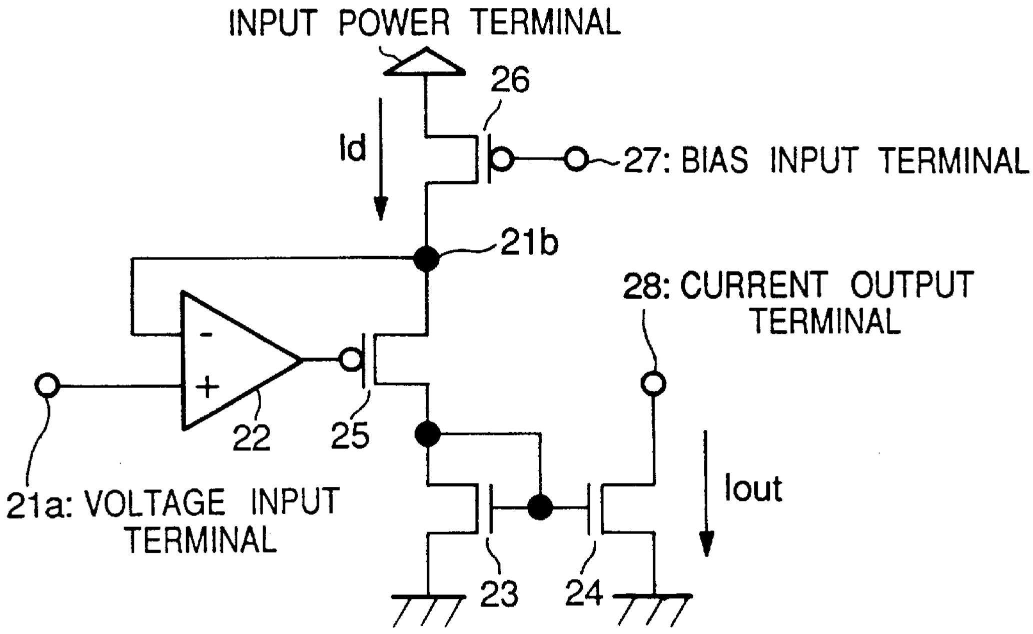
FIG. 3 is a third embodiment of the v/c conversion circuit of the present invention.

A third embodiment will be presented with reference to FIG. 3. The positive input terminal of the OP amp 22 is connected to the voltage input terminal 21*a* of the v/c conversion circuit, the negative input terminal to the node 21*b*, and the output terminal to the gate terminal of the p-type MOSFET 25. The source terminal of the p-type MOSFET 25 is connected to the node 21*b* (negative input terminal of the OP amp 22). For the p-type MOSFET 26, which replaces the function of a conventional v/c conversion resistor, the drain terminal is connected to the node 21*b*, and the gate terminal to the bias terminal 27, and the source terminal to a power source. The n-type MOSFET 23 and the n-type MOSFET 24 constitute a current mirror, and the source terminals of the n-type MOSFET 23 and the n-type MOSFET 24 are respectively grounded, the gate and drain terminals of the n-type MOSFET 23 and the gate terminal of the n-type MOSFET 24 are connected to the drain terminal of the p-type MOSFET 25. The drain terminal of the n-type MOSFET 24 is connected to the output current terminal 28 of the v/c conversion circuit.

Denoting A as the gain of the OP amp 22, Va as the potential at the voltage input terminal 21*a* and Vb as the potential at the node 21*a*, the output potential of the OP amp 22 (gate potential of the p-type MOSFET 25) is given by A·(Vb−Va). The drain current Id of the p-type MOSFET 25 is given by equation 6:

$$\begin{aligned} Id &= Kp \cdot \{A \cdot (Vb - Va) - Vb - Vtp\}^2 \\ &= Kp \cdot [A \cdot \{Vb - Va - (Vb + Vtp)/A\}]^2 \end{aligned} \qquad \text{Eqn. 6}$$

where Vtp is a threshold voltage value of the p-type MOSFET 25, and Kp is an empirical constant determined by the transistor size and fabrication process.

Denoting VDD as the voltage at the power source terminal, Rds as the resistance between the source and drain of the p-type MOSFET 26, the drain current Id is expressed by equation 7:

$$Id=(VDD-Vb)/Rds \qquad \text{Eqn. 7}$$

From equations 6 and 7, the following equation 8 can be derived:

$$(VDD-Vb)/Rds=Kp\cdot[A\cdot\{Vb-Va-(Vb+Vtp)/A\}]^2$$

$$\{Vb-Va-(Vb+Vtp)/A\}^2=(VDD-Vb)/(Rds\cdot Kp\cdot A^2) \qquad \text{Eqn. 8}$$

If it is assumed that the gain A of the OP amp 22 is sufficiently greater than the potential (VDD−Vb) and (Vb+Vtp), then the following equation can be derived:

$$(Vb-Va)^2\approx 0, \text{ leading to} \qquad \text{Eqn. 9}$$

$$Va\approx Vb$$

Because of the action of the OP amp 22 in conjunction with p-type MOSFET 25 and the p-type MOSFET 26, the potential Vb at the node 21*b* always follows the potential Va at the voltage input terminal 21*a*. If the potential at the voltage input terminal 21*a* is Va=Vin, then the potential at the node 21*b* will also be Vb=Vin.

Because the current does not flow in the gate terminal of MOSFETs, the values of the current flowing in the p-type MOSFET 25 and the p-type MOSFET 26 are always equal to the value of the current flowing in n-type MOSFET 23.

Also, because the n-type MOSFET 23 and the n-type MOSFET 24 form a current mirror, the potentials between the gate/source terminals in both transistors 23, 24 are always equal to each other, and if the transistor sizes are the same, the magnitude of the current flowing in the two transistors 23 is the same as that flowing in the transistor 24. In other words, the output current Iout flowing out of the current output terminal 28 equals the current flowing in the p-type MOSFET 26.

Thus, the voltage-current characteristics of the input voltage Vin at the voltage input terminal 21*a* to output current Iout at the current output terminal 28 are the same as those between the potential Vb at the node 21*b* and the drain current Id of the p-type MOSFET 26.

Figure 9:
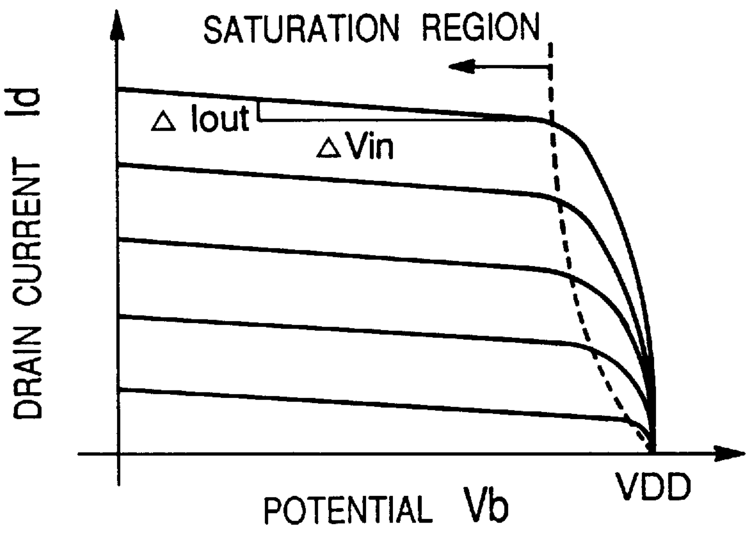
FIG. 9 is a characteristic voltage/current curve of a p-type MOSFET.

The voltage-current characteristic curve of the p-type MOSFET 26 is shown in FIG. 9. This relation is directly applicable to that for the input voltage Vin vs. output current Iout of the third embodiment v/c conversion circuit.

When the potential at the bias input terminal 27 (gate potential of p-type MOSFET 26) is constant and the p-type MOSFET 26 is operating in its saturation region, changes in the drain current Id are small with respect to the changes in the potential Vb at the node 21*b*, and the same voltage-current relationship, as the voltage-current relationship based on a high value resistor element, is obtained.

The slope of the voltage-current curve of a MOSFET operating in the saturation range is affected by the degree of channel length modulation effect, so that by increasing the gate length of MOSFET 26 so as to decrease the channel length modulation effect, it is possible to obtain a circuit having a lesser slope, i.e., a v/c conversion circuit exhibiting a low voltage/current conversion ratio.

Furthermore, by changing the potential at the bias input terminal 27, it is possible to change the level of the drain current, with negligible change in the slope of the curve, thereby enabling to freely select a desired level of output current.

Figure 4:
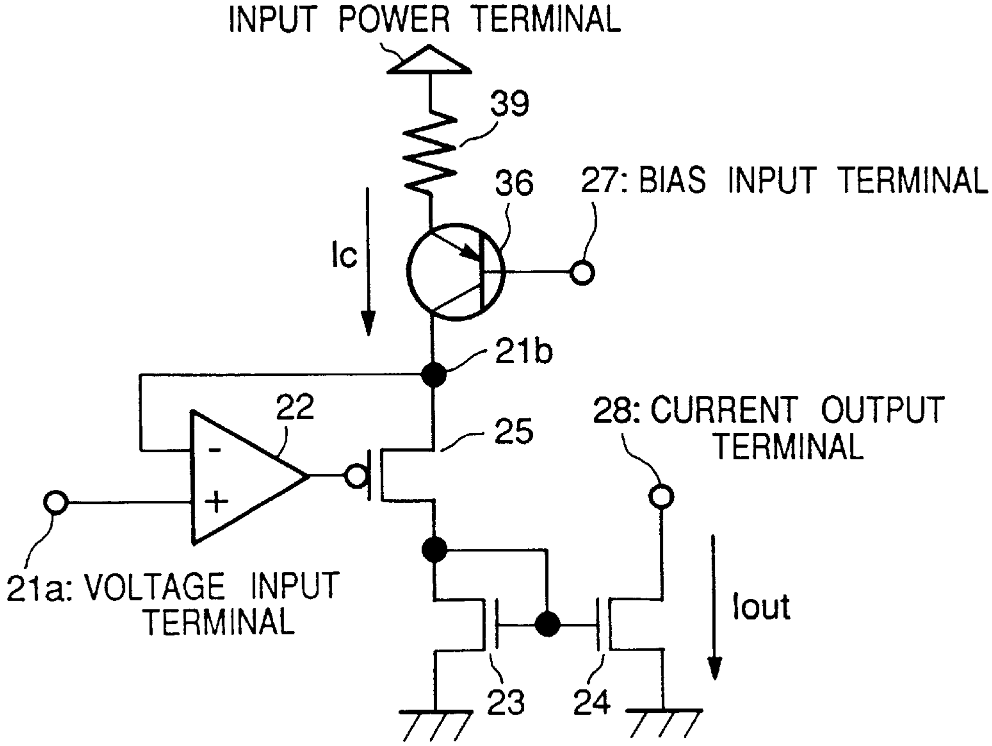
FIG. 4 is a fourth embodiment of the v/c conversion circuit of the present invention.
Figure 5:
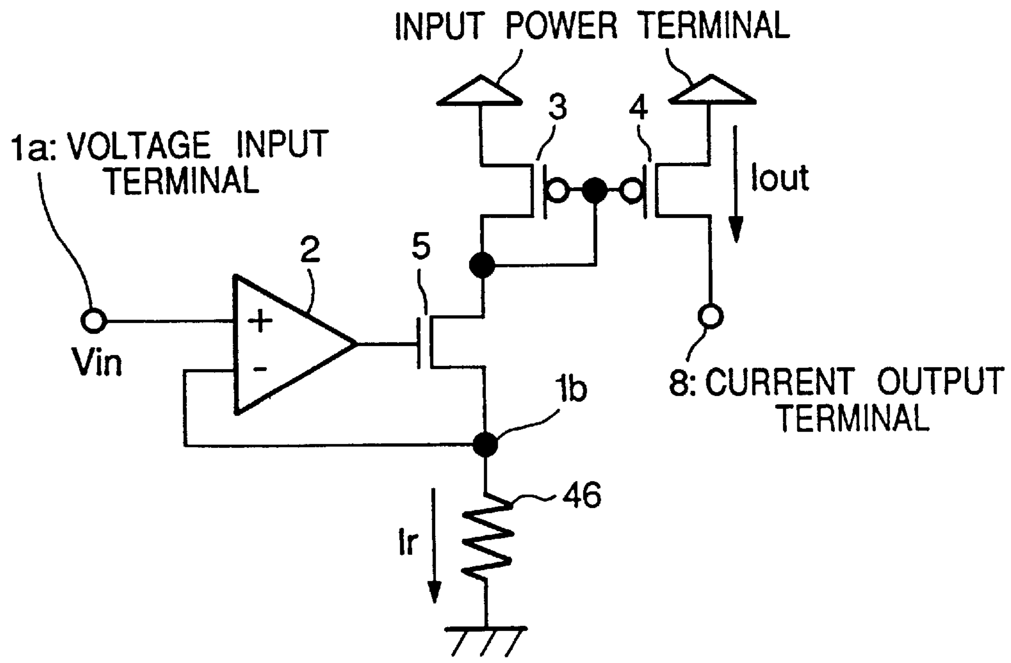
PRIOR ART FIG.5
FIG. 5 is a schematic circuit diagram of a conventional v/c conversion circuit.
Figure 6:
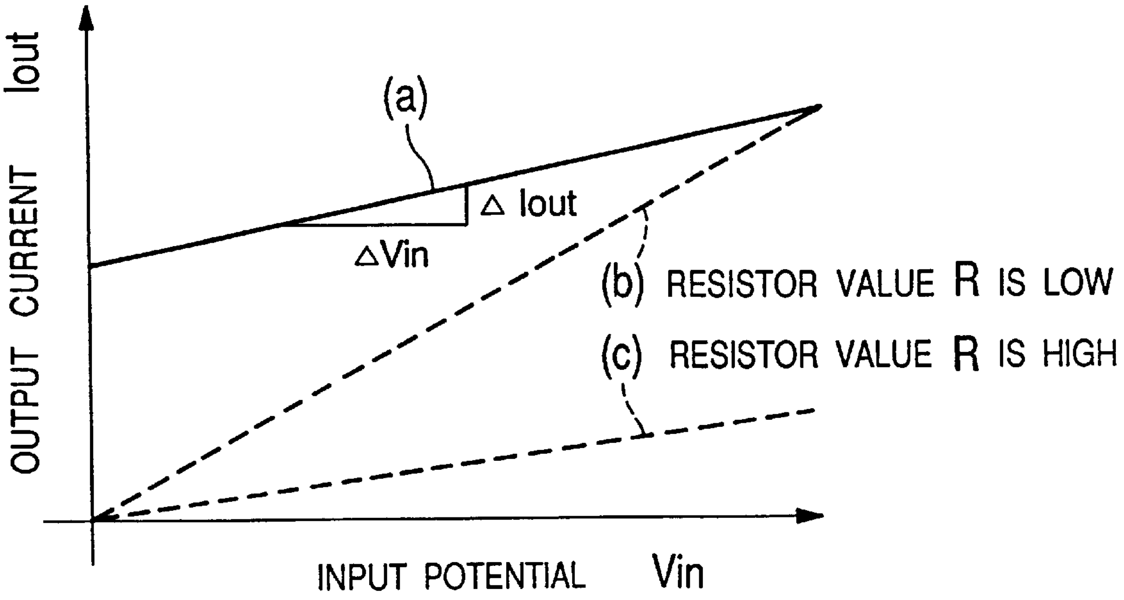
PRIOR ART FIG.6
FIG. 6 is a characteristic voltage/current curve of a conventional v/c conversion circuit.

A fourth embodiment will be presented with reference to FIG. 4. The fourth embodiment conversion circuit is obtained by replacing the p-type MOSFET 26 in the third embodiment, shown in FIG. 3, with a p-n-p bipolar transistor 36 and a resistor element 39.

The n-p-n bipolar transistor 36 has its collector terminal connected to the node 21*b*, and the base terminal to the bias input terminal 27. One terminal of the resistor element 39 is connected to the emitter terminal of the n-p-n bipolar transistor 39 and the other terminal is connected to a power source.

As in the third embodiment circuit, the potential Va at the input terminal 21*a* and the potential Vb at the node 21*b* are equal, and the collector current Ic flowing in the n-p-n bipolar transistor 36 is equal to the output current Iout flowing out from the current output terminal 28. Therefore, the characteristic curve of the input voltage Vin vs. output current Iout of the v/c conversion circuit of the fourth embodiment is the same as that of the potential Vb at the node 21*b* vs. collector current Ic in the n-p-n bipolar transistor 36.

Figure 10:
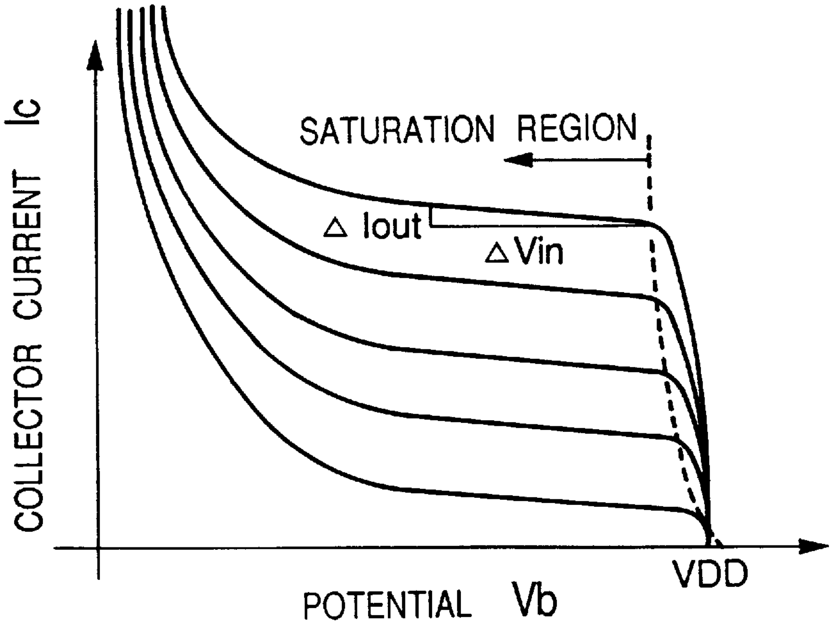
FIG. 10 is a characteristic voltage/current curve of a p-n-p bipolar transistor.

FIG. 10 shows a voltage-current curve of the n-p-n bipolar transistor 36 having a resistor element 39 connected between the emitter and the power input terminal. The slope of the voltage-current curve in the saturation range is affected by the value of the resistor element 39 connected between the emitter and the power input terminal. By increasing the value of the resistor element 39, the slope decreases so that a v/c conversion circuit having a low voltage/current conversion ratio can be realized. Although the aspect of the circuit that the resistor value determines the voltage/current conversion ratio is the same as in the conventional v/c conversion circuit, it should noted that the present conversion circuit shown in FIG. 4 differs from the conventional conversion circuit, because the v/c conversion resistor 39 is utilized in a series-arrangement with an n-p-n bipolar transistor 36, it means that a low voltage/current conversion ratio can be achieved with a value of the resistor element 39 small enough (several tens of ohms to several hundreds of ohms) to be produced within the capability of ordinary IC fabrication processes. In other words, the v/c conversion circuit of the second embodiment can be produced without increasing neither the number of processing steps nor the substrate area.

Similar to the third embodiment circuit, by changing the potential of the bias input terminal 27 (base current in the n-p-n bipolar transistor 26) the level of the output current Iout can be freely selected, independent of the voltage/current conversion ratio.

What is claimed is:

1. A voltage/current conversion circuit comprising:

a first active element functioning as a voltage/current conversion resistor;

a comparator having a first input terminal connected to a voltage input terminal, and a second input terminal connected to an output terminal of said first active element;

a second active element having a control terminal connected to an output terminal of said comparator, and an input terminal connected to said output terminal of said first active element so as to function as an active load;

a third active element having an input terminal connected to a power input terminal, and an output terminal and a control terminal connected to an output terminal of said second active element; and a fourth active element having an input terminal connected to said power input terminal, a control terminal connected to said control terminal of said third active element, and an output terminal connected to a current output terminal so as to provide a flow of electrical current whose magnitude is proportional to a magnitude of electrical current flowing in said third active element;

wherein said first, second, third and fourth active elements correspond, respectively, to first, second, third and fourth transistors; and wherein said first transistor is an n-p-n bipolar transistor whose emitter terminal is connected to a resistor, said second transistor is an n-type MOSFET, said third transistor is a first p-type MOSFET and said fourth transistor is a second p-type MOSFET; wherein said input terminal corresponds to a source terminal in said n-type MOSFET, in said first p-type MOSFET and in said second p-type MOSFET; said output terminal corresponds to a drain terminal in said n-type MOSFET, in said first p-type MOSFET and in said second p-type MOSFET; and said control terminal corresponds to a gate terminal in said n-type MOSFET, in said first p-type MOSFET and in said second p-type MOSFET.

2. A voltage/current conversion circuit according to claim 1, wherein said comparator is an operational amplifier, wherein a first input terminal is a positive input terminal and a second terminal is a negative input terminal.

3. A voltage/current conversion circuit comprising:

a first active element functioning as a voltage/current conversion resistor;

a comparator having a first input terminal connected to a voltage input terminal, and a second input terminal connected to an output terminal of said first active element;

a second active element having a control terminal connected to an output terminal of said comparator, and an input terminal connected to said output terminal of said first active element so as to function as an active load;

a third active element having an output terminal and a control terminal connected to an output terminal of said second active element; and a fourth active element having a control terminal connected to said control terminal of said third active element, and an outupt terminal connected to a current output terminal so as to provide a flow of electrical current whose magnitude is proportional to a magnitude of electrical current flowing in said third active element; wherein said first, second, third and fourth active elements correspond, respectively, to first, second, third and fourth transistors; and wherein said first transistor is an p-n-p bipolar transistor whose emitter terminal is connected to a resistor, said second transistor is a p-type metal oxide semiconductor field-effect transistor (p-type MOSFET), said third transistor is a first n-type MOSFET and said fourth transistor is a second n-type MOSFET; wherein said input terminal corresponds to a source terminal in said p-type MOSFET, in said first n-type MOSFET and in said second n-type MOSFET; said output terminal corresponds to a drain terminal in said p-type MOSFET, in said first n-type MOSFET and in said second n-type MOSFET; and said control terminal corresponds to a gate terminal in said p-type MOSFET, in said first n-type MOSFET and in said second n-type MOSFET.

4. A voltage/current conversion circuit according to claim 3, wherein said comparator is an operational amplifier, wherein a first input terminal is a positive input terminal and a second terminal is a negative input terminal.

* * * * *